(No Model.) 3 Sheets—Sheet 3.
S. G. HOWE.
PIPE TAPPING AND CONNECTING DEVICE.
No. 600,831. Patented Mar. 15, 1898.
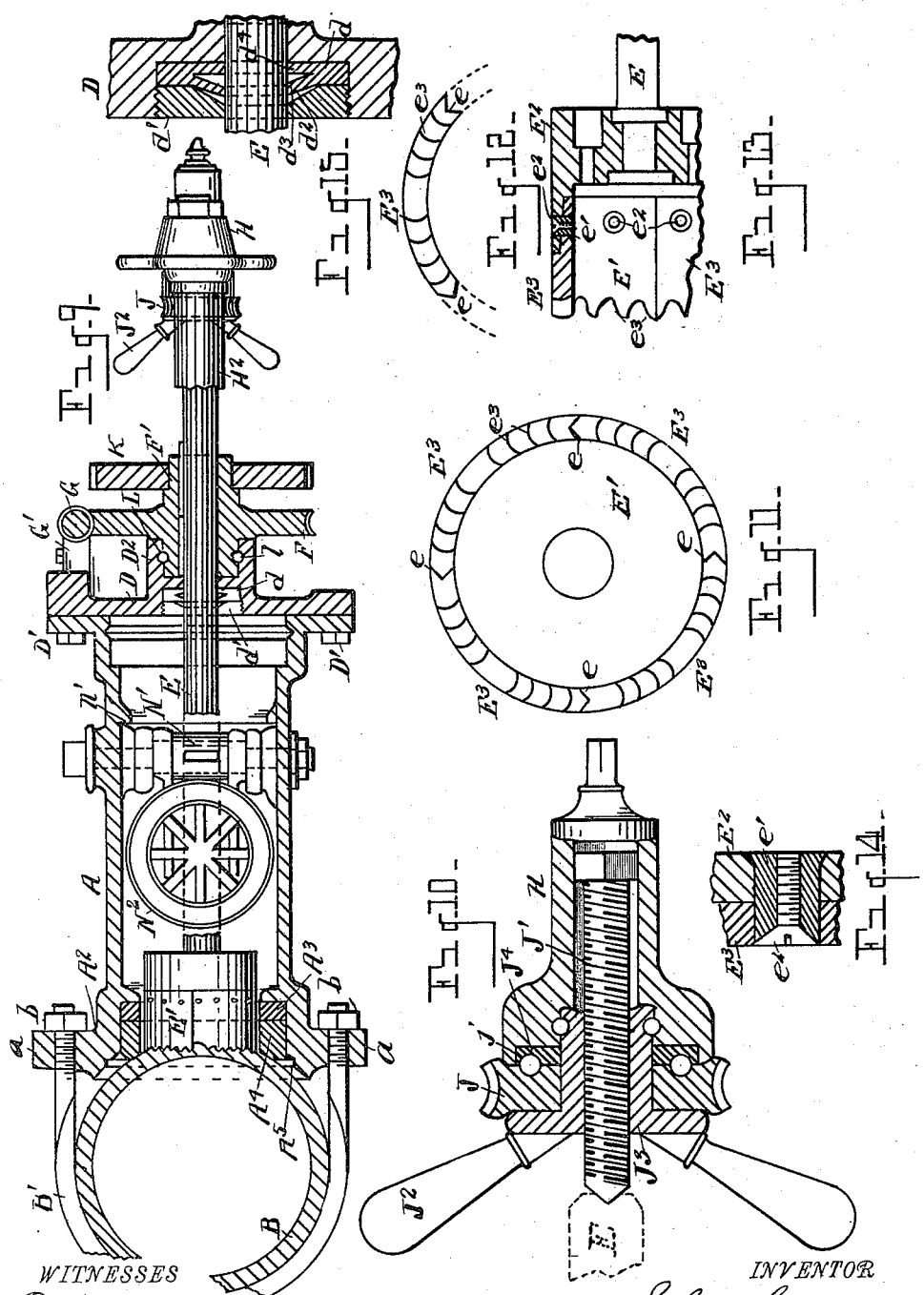
WITNESSES
INVENTOR
Solon G. Howe
By his Attorney
Newell S. Wright

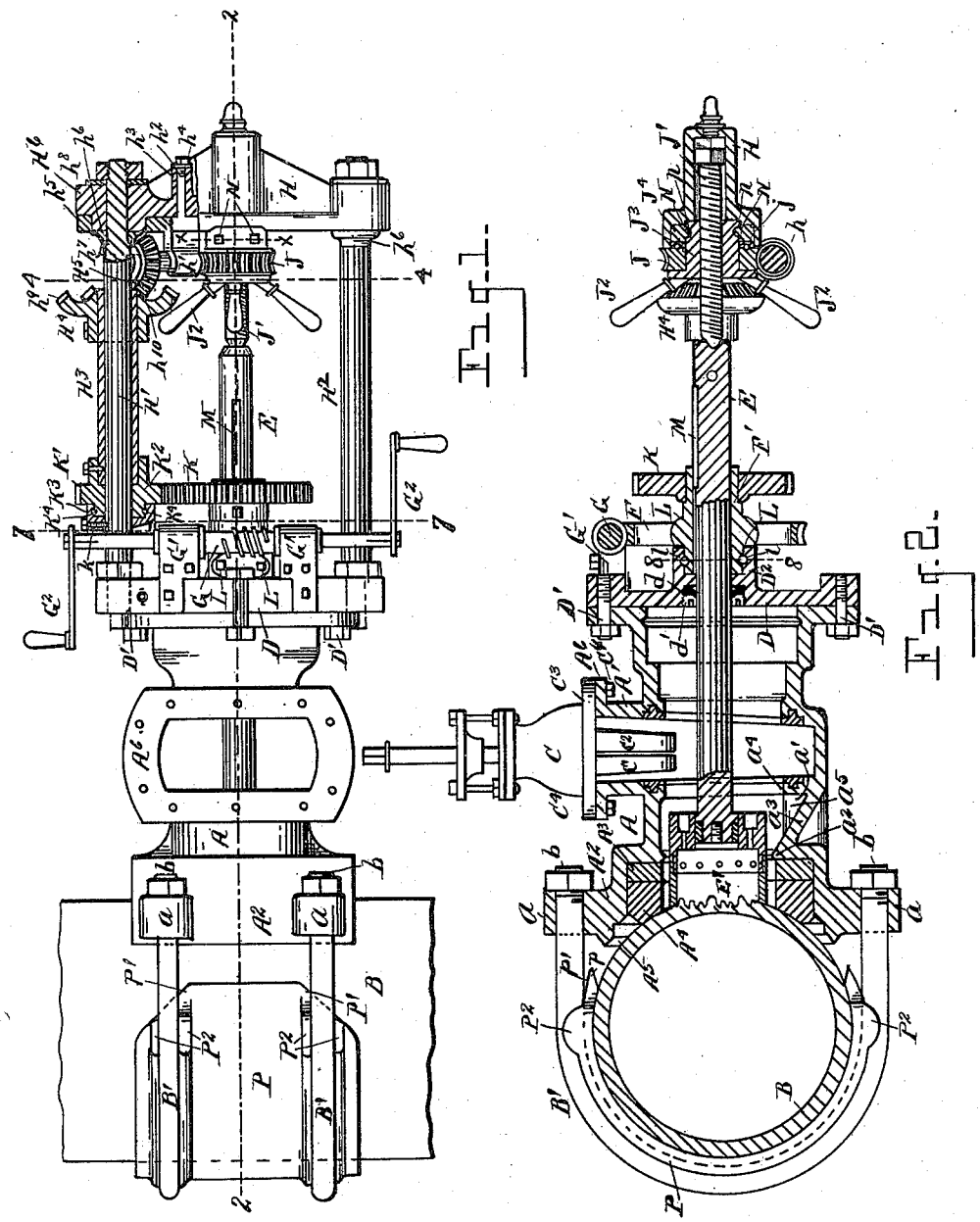

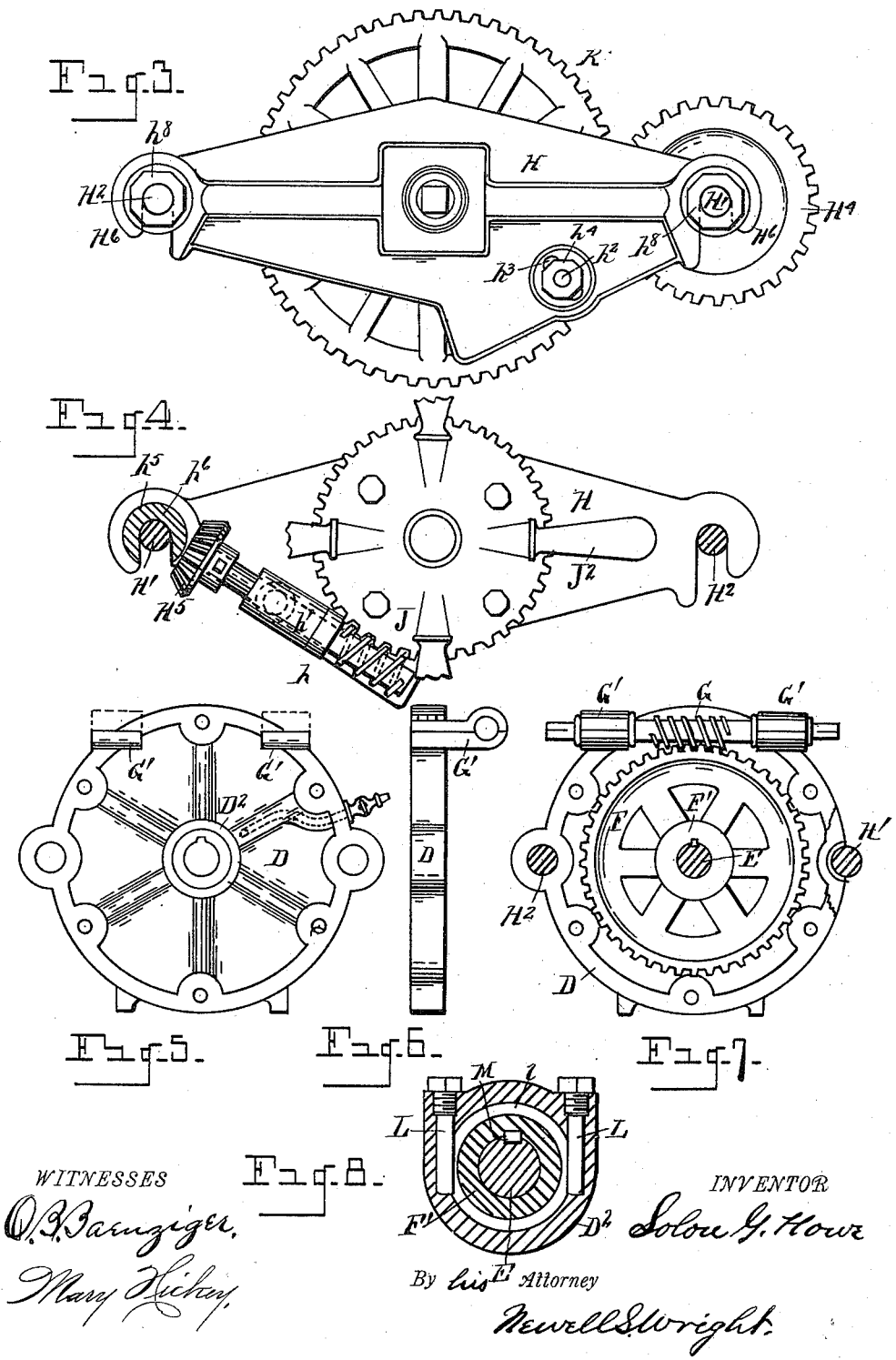

UNITED STATES PATENT OFFICE.

SOLON G. HOWE, OF DETROIT, MICHIGAN, ASSIGNOR OF ONE-HALF TO DAVID INGLIS, OF SAME PLACE.

PIPE TAPPING AND CONNECTING DEVICE.

SPECIFICATION forming part of Letters Patent No. 600,831, dated March 15, 1898.

Application filed June 28, 1897. Serial No. 642,669. (No model.)

*To all whom it may concern:*

Be it known that I, SOLON G. HOWE, a citizen of the United States, residing at Detroit, county of Wayne, State of Michigan, have invented a certain new and useful Improvement in Pipe Tapping and Connecting Devices; and I declare the following to be a full, clear, and exact description of the invention, such as will enable others skilled in the art to which it appertains to make and use the same, reference being had to the accompanying drawings, which form a part of this specification.

My invention has for its object certain new and useful improvements in a pipe tapping and connecting device; and it consists of the construction, combination, and arrangement of devices and appliances hereinafter described and claimed, and shown in the accompanying drawings, in which—

Figure 1 is a plan view showing parts in section. Fig. 2 is a longitudinal section on the line 2 2, Fig. 1. Fig. 3 is an end view looking toward the pressure-bar. Fig. 4 is a view in section on the line 4 4, Fig. 1, looking toward the pressure-bar. Fig. 5 is a detail view of the head-plate. Fig. 6 is an end view of the same. Fig. 7 is a view in section on the line 7 7, Fig. 1. Fig. 8 is a view in section on the line 8 8, Fig. 2. Fig. 9 is a longitudinal section showing a modification. Fig. 10 is an enlarged detail view in section illustrating features of my invention. Fig. 11 is an end view of the cutter-head. Fig. 12 is an end view of one of the segments of the cutter-head. Fig. 13 is a detail view of the cutter-head in longitudinal section. Fig. 14 is a detail view in section showing means for engaging the segments of the cutter-head in place. Fig. 15 is an enlarged detail view in section, showing the packing $d$ and related parts.

My invention is designed in certain respects as an improvement upon a pipe tapping and connecting device embodied in Letters Patent of the United States granted to me July 7, 1896, No. 563,488, and in a pending application filed by me March 30, 1897, Serial No. 629,976, my present invention having for its object the simplifying and cheapening of the cost of construction and the greater utility and efficiency of the pipe tapping and connecting device.

I carry out my invention as follows:

One feature of my present invention respects the combined sleeve and gate accordingly.

A represents a sleeve which may be provided with a gate-valve casing A', as shown in Figs. 1 and 2, the sleeve being engageable upon a pipe B in any suitable manner, as by metallic bands B'. The sleeve at the end adjacent to the pipe may be formed with a flange or saddle $A^2$ to fit upon the pipe with suitable intermediate packing and with perforated ears $a$ to receive the ends of the fastening-bands B', said bands being held in place by nuts $b$.

The saddle or flange $A^2$ is constructed to form a packing-chamber between it and the pipe, in which may be located a packing $A^3$, preferably a compressible packing, as of fiber or analogous material, and a cushion $A^4$, preferably of wood or analogous material, extending outward from the packing $A^3$, the cushion taking the strain in case of any unevenness between the flange or saddle $A^2$ and the adjacent portion of the pipe when the sleeve is secured upon the pipe. $A^5$ is a lead packing outside the cushion $A^4$, as shown in Figs. 2 and 9.

C is a gate-valve housing provided with valves $c'$ $c^2$ to seat within the casing A'. Said casing is formed, preferably, with a flange $A^6$, whereby the sleeve and gate may be united, the housing C being provided with a similar flange $C^3$, through which the parts may be bolted together, as indicated at $C^4$.

D is a head-plate engaged upon the adjacent end of the sleeve, said sleeve and plate being preferably provided with flanges through which the plate and sleeve may be bolted together, as shown at D'. This head-plate is employed as a means for attaching the tapping mechanism to the sleeve, and its use is not limited within the scope of my invention to application to any particular construction and arrangement of sleeve alone. It is found adapted equally well, for example, for attachment to a sleeve combined with a gate of the form shown in Fig. 2, and also to a sleeve provided with a wing-gate, as illustrated in Fig. 9, the sleeve and wing-gate shown in Fig. 9 being constructed and arranged as embodied in my above-named application, Serial No. 629,976, and which will be more fully hereinafter described. E denotes a mandrel reciprocatory through said head-plate and provided with a cutter-head E'. The plate is provided with a packing, as at $d$.

F is a driving-gear provided with a hub F', mounted upon the mandrel E.

G is a worm meshing directly with the driving-gear F. This worm is journaled in bearings G', engaged upon the head-plate D.

H is a pressure-bar engaged upon bars H' and H$^2$, united to the connected flanges of the head-plate and sleeve A. Upon the bar H' is engaged a sleeve H$^3$, upon which is mounted a gear H$^4$, meshing with a pinion H$^5$, which drives a worm $h$, said worm meshing with a worm-gear J, operating a rotatable nut J$^3$ upon a non-rotatable feed-screw J'. The feed-screw preferably contacts with the mandrel E. This worm-gear feed, to drive the feed-screw and thereby to feed the cutter-head to the work, may be actuated automatically, or the feed-screw may be actuated by hand, as may be desired. To actuate the worm-gear feed automatically, the hub F is provided with an additional feeding-gear K, meshing with a pinion K' on the sleeve H$^3$. To actuate the feed-screw by hand, the nut J$^3$ may be provided with handles J$^2$, whereby the said nut may be actuated.

The worm $h$ may be arranged to be readily thrown out of gear with the worm J in any suitable manner. Thus a bearing $h'$ for the worm $h$ may be carried by a locking-pin $h^2$, engaged in an oblong slot $h^3$ in the pressure-bar H. By loosening the locking-nut $h^4$ upon the pin $h^2$ the worm $h$ may be dropped away from the gear J. To make this action of the worm $h$ possible, its bearing or holder $h'$ must be hinged or jointedly supported, as upon the adjacent end of the bar H'. To this end the said bearing may be provided with a suitable hook $h^5$ to engage upon a boss $h^6$ upon the pressure-bar H.

When it is desired to actuate the feed-screw automatically, the worm $h$ is adjusted into mesh with the worm J, when by operating the worm G the gear K is actuated, meshing with the pinion K', thereby actuating the worm $h$ by means of the gears H$^4$ and H$^5$.

The worm-gear J, as already indicated, is mounted upon the feed-nut J$^3$ upon the feed-screw J'. This feed-screw may be held from turning in any suitable manner, as by a squared head. A ring J$^4$ is located about one end of said nut, as shown, between the nut and the adjacent portion of the pressure-bar H, said bar being recessed to receive one end of the feed-screw and one end of the said nut and said ring. Between said ring and the adjacent face of the worm-gear may be located ball-bearings, as at $j$. This construction of the feeding mechanism makes it readily interchangeable by throwing the worm $h$ into or out of engagement with the worm-gear J'. The pressure-bar H is preferably engaged upon the bars H' and H$^2$ between a washer $h^7$ and a nut $h^8$ of each of said bars. Said pressure-bar may be constructed with hooks, as at H$^6$, to engage upon the bars H' and H$^2$. This makes a quick and secure means of engaging the pressure-bar upon the bars H' and H$^2$.

I prefer to make the packing $d$ of rubber, bifurcated, as shown more particularly in Fig. 15, arranged so that the pressure of water within the sleeve will cause the packing to hug down tight upon the mandrel and still permit the reciprocation of the mandrel. The packing $d$ is held in place by a nut $d'$, said nut being spaced from the mandrel and turned off adjacent to the packing to form a channel $d^2$ between the nut and the toe $d^3$ of the packing. It is obvious that the onward movement of the mandrel will move the toe of the packing away from the mandrel, the heel $d^4$ of the packing still hugging the mandrel. When the mandrel moves in the opposite direction, the pressure of the water striking the outer point of the packing will force it down firmly upon the mandrel. The greater the water-pressure the more firmly will the packing thus hug the mandrel.

The gear H$^4$ is preferably constructed as a double gear having an outer row of teeth, as at $h^9$, and an inner row $h^{10}$, both constructed to mesh with the gear H$^5$, the latter gear being made adjustable in any desired manner to mesh with either the inner or outer teeth of the gear H$^4$. This arrangement obviously provides for two differential and adjustable feeds of the feed-screw, as moving the gear H$^5$ into mesh with the outer teeth of the gear H$^4$ will give a faster feed, and vice versa.

This construction and arrangement of my improved feeding mechanism provide a ready means for an interchangeable, an automatic, and an adjustable feed of the cutting mechanism. As shown, the plate D is provided with a collar D$^2$, extending about the adjacent end of the hub F' upon the mandrel. I interlock said collar and hub by means of screw pins or bolts L, inserted through the collar D$^2$, the said collar and the said hub being constructed with adjacent grooves (indicated at $l$) to receive said pins or bolts L, the pins being partly embraced by the collar and partly by the hub. The mandrel and hub are provided with a key M. The nut J$^3$ and the adjacent portion of the pressure-bar H are similarly locked together by pins N, the said bar and nut being constructed with adjacent grooves (indicated at $n$) to receive the said pins N in a manner similar to the construction shown in Fig. 8. So, also, the hub K$^2$ of the gear K' is locked to a collar K$^3$ upon the bar H' in a similar manner, as by pins K$^4$, the collar K$^3$ being secured to the bar H' by means of a set-screw $k$. The worm G may be actuated in any suitable manner, the same being shown constructed to receive operating-handles G².

The cutter-head E', I prefer to construct with a body E², the cutting portion of the head being formed of segments E³, one segment being shown in Fig. 12, the segments being locked together at their adjacent edges, as indicated at e, the segments being secured to the body E² in any suitable manner, as by means of a thimble-nut e' and screw e², although I do not limit myself to fastening segments to the body in this particular manner only. I prefer that the body E² of the cutter-head should be constructed with a lip or flange projecting outside and about the periphery of the segments E³, as indicated in Fig. 13. In operation the segments have a tendency to spread and spring away from the cutter-head unless they are securely confined, as by my form of construction. With a cutter-head so constructed the body E² may be made of any suitable casting or cheap material, while the segments of the cutter-head may be made of a thin blade of steel. It is obvious that the body E² does not need to be tempered. By this construction of the cutting portion of the head in segments said segments may be properly tempered without springing or warping and when formed may be attached to the body, thus forming a cutter-head at the least possible expense. Where the cutting portion of the head is formed of an integral piece, it is found difficult to keep it from springing or warping in tempering. This difficulty, however, is effectually overcome by constructing the device with the cutting-segments. I prefer that the cutting portion of the head should be formed with oval teeth, as indicated at e³, as a cutter formed with oval teeth readily finds its own center and does not need a guide.

The wing-gate valve (shown in Fig. 9) is indicated at N², the same being engaged upon a hinge pin or journal N', (indicated in dotted lines in Fig. 9,) the extremities of which are supported in the sleeve, the wing-gate valve C being arranged to close upon a seat, (indicated at n'.)

P represents a back supporting-plate which I prefer to apply to the pipe on the side opposite the cut when a large area is cut out of the pipe in making a connection. As is well known, the shutting of gates frequently creates what is called a "ram," which produces an extraordinary strain upon the pipe, and this back plate is provided to guard against this excessive strain in such a case. Between the edges of said supporting-plate P and the adjacent edges of the sleeve between the tie-bands I provide for the lead packing to be run in, the back plate being constructed with a recess (indicated at p) to form a lock thereat to hold the lead. At the same time the supporting-plate is so constructed and arranged as to allow the use of calking-tools to calk the lead joint about the sleeve. To this end the outer edge of the plate P may be beveled, as indicated at p', to facilitate the introduction of a calking-tool. The plate may also be beveled toward its ends, as indicated at P', to facilitate the introduction of a calking-tool and also the introduction of a clay band to hold and support the lead when poured into the joint. This plate may be formed with ears (indicated at P²) to hold the bolts or bands B' in position.

It will be seen that the cutting mechanism, with the head-plate carrying the same, can readily be adjusted upon a sleeve having a gate as shown in Fig. 2 or upon a sleeve provided with a wing-gate, as shown in Fig. 9.

In Fig. 2 of the drawings I have shown the sleeve constructed with an inner pocket, as indicated at a', the sleeve being formed with an inwardly-projecting flange a² to form a seat for the packing, the inner surface of the sleeve extending outward from the flange a² at an angle and forming said pocket between the angular portion a³ and a flange a⁴, forming the adjacent valve-seat. The sleeve is also provided with a supporting-rib a⁵ within said pocket. Said pocket forms a receptacle for the cuttings or chips formed by the cutting-tool.

What I claim as my invention is—

1. The combination of a sleeve provided with a gate, cutting mechanism, a worm to drive the cutting mechanism, a non-rotatable feed-screw, a feed-nut, a feeding-gear upon said nut, a worm to drive said cutting mechanism and said feeding-gear, and interchangeable gears intermediate said worm and feeding-gear, for the purpose described.

2. The combination of a pipe, a sleeve provided with a gate, means to secure the combined sleeve and gate upon the pipe, compressible packing to act as a cushion between the sleeve and the pipe and to take the water-pressure and the lead packing outside the compressible packing, for the purpose described.

3. The combination of a sleeve provided with a gate, means to secure the sleeve upon a pipe, cutting mechanism and the interchangeable feeding mechanism, having a feed-screw, a gear to drive the screw, and a worm to mesh with said gear, said worm movable into and out of mesh with said gear, for the purpose described.

4. The combination of a sleeve provided with a gate, means to secure the sleeve upon a pipe, cutting mechanism and the interchangeable feeding mechanism, having a feed-screw, a gear to drive the feed-screw, an oscillatory worm to mesh with said gear, and a movable bearing carrying said worm, for the purpose described.

5. The interchangeable feeding mechanism herein set forth, having in combination a pressure-bar, a feed-screw, a gear to drive the feed-screw, an oscillatory worm to mesh with said gear, and a movable bearing provided with a locking-pin having a movable engagement with said pressure-bar, for the purpose described.

6. The feeding mechanism herein set forth, having in combination a pressure-bar, a feed-screw, a feed-nut thereupon constructed with an annular groove, a gear upon the feed-nut, and a locking-pin passed through the pressure-bar into said annular groove, for the purpose described.

7. The combination of a mandrel provided with a cutter-head, mechanism to drive the mandrel, a head-plate constructed with a collar, a gear provided with a hub constructed with an annular groove engaged upon said mandrel, and projecting within the collar of the head-plate, and a locking-pin passed through said collar and projecting into said groove, for the purpose described.

8. The combination of a mandrel provided with a cutter-head, a gear mounted thereupon, the bar H', a gear upon said bar meshing with the gear upon the mandrel, a hub carrying the gear upon said bar constructed with an annular groove, a locking-collar engaging said hub and a locking-pin passed through said collar engaging said groove, for the purpose described.

9. The combination of a sleeve, a head-plate, cutting mechanism, a driving device to actuate the cutting mechanism a pressure-bar, a feed-screw, feeding mechanism to drive said screw, and bars connecting the pressure-bar with said head-plate, said pressure-bar having a removable engagement upon said bars, for the purpose described.

10. The combination of a sleeve provided with a gate, a head-plate, cutting mechanism, a driving device to actuate the cutting mechanism, a pressure-bar, a feed-screw, feeding mechanism to drive said feed-screw, bars connecting the pressure-bar with said head-plate, said pressure-bar provided with hooks to engage the cutting-bars, and a nut upon each of said cutting-bars to hold the pressure-bar in place, for the purpose set forth.

11. The combination of a sleeve provided with a gate, cutting mechanism, a worm to drive the cutting mechanism, a feed-screw, a feed-nut thereupon, a feeding-gear upon said nut, and an additional worm meshing with said feeding-gear, said latter worm driven by the first-mentioned worm, for the purpose described.

12. The combination of a sleeve provided with a gate, cutting mechanism, a driving device to drive said cutting mechanism, a feed-screw, a feed-nut thereupon, a feeding-gear upon said nut, and a worm meshing with said feeding-gear, said worm driven by said driving device, for the purpose set forth.

13. The combination of a sleeve provided with a gate, cutting mechanism, a driving device to drive said cutting mechanism, a feed-screw, a feed-nut thereupon, a feeding-gear upon said nut, a worm meshing with said feeding-gear, and gear to drive said worm driven by said driving device, for the purpose set forth.

14. The combination of a sleeve provided with a gate, cutting mechanism provided with a rotatable reciprocatory mandrel, a driving-gear upon the mandrel, a worm to drive said gear, a non-rotatable reciprocatory feed-screw to advance the mandrel, and adjustable gear driven by said worm to advance the feed-screw, the mandrel and feed-screw located end to end, for the purpose described.

15. The combination of a sleeve provided with a gate, cutting mechanism, a driving device to drive the cutting mechanism, a feed-screw, a gear to drive said feed-screw, and a worm actuated by said driving device to actuate said gear, said worm movable into and out of mesh with said gear, for the purpose set forth.

16. The combination of a sleeve provided with a gate, cutting mechanism, a driving device to actuate the cutting mechanism, and automatic feeding mechanism provided with a non-rotatable feed-screw and with interchangeable and adjustable gears, for the purpose set forth.

17. The combination of a sleeve provided with a gate, cutting mechanism provided with a rotatable reciprocatory mandrel, a head-plate carrying the cutting mechanism, a worm upon the head-plate to drive the cutting mechanism, feeding mechanism provided with a non-rotatable reciprocatory feed-screw to advance the mandrel, means driven by said worm to automatically advance the feed-screw, and means for actuating the feeding mechanism by hand, the means for automatically actuating the feeding mechanism arranged to be thrown into and out of operation, the mandrel and feed-screw located end to end, for the purpose set forth.

18. The combination of a reciprocatory mandrel, a support through which the mandrel reciprocates, a bifurcated flexible packing-ring located about the mandrel, and a nut spaced from the mandrel to hold the packing-ring in place and forming a chamber between the nut and the packing-ring, for the purpose set forth.

19. In a pipe tapping and connecting device, the combination of a sleeve provided with a gate, engageable on the pipe, a supporting-plate, and means to secure the supporting-plate and sleeve upon the pipe, said plate and sleeve arranged to permit the insertion of calking-tools between the plate and the sleeve, for the purpose set forth.

20. In a pipe tapping and connecting device, the combination of a sleeve provided with a gate, engageable thereupon, a supporting-plate, and a packing between the sleeve and the adjacent edges of the plate, for the purpose set forth.

21. In combination, a mandrel, provided with a cutter-head, driving-gear mounted thereupon, a worm to mesh with said gear, automatic feeding mechanism provided with a gear K', and a gear mounted upon the mandrel meshing with the gear K', for the purpose described.

22. The combination of a feed-screw, a feeding-gear to actuate said screw, an oscillatory bearing provided with a locking-pin, a gear carried by said bearing, a worm carried by said bearing, and a driving device to actuate said gear, for the purpose set forth.

23. The combination of a head-plate, a mandrel, a driving device to actuate the mandrel, a pressure-bar, connecting-bars uniting the pressure-bar to the head-plate, a feed-screw, a feed-gear to actuate the screw, a bearing provided with a hook to engage upon one of the connecting-bars, and with a locking-pin to engage the pressure-bar, a gear carried by said bearing, and a worm carried by said bearing to mesh with the feeding-gear, the gear carried by said bearing actuated by the said driving device, for the purpose set forth.

24. A sleeve provided with a gate and with a valve-seat projecting inwardly on the under side of the sleeve, and with an inwardly-projecting flange to form a packing-seat located intermediate the valve-seat and the end of said sleeve, said sleeve provided with an outwardly-enlarged pocket intermediate said flange and inwardly-projecting valve-seat, for the purpose set forth.

25. A cutter-head constructed with a body, and cutter-segments united to the body, said body formed with a flange projecting around and outside the adjacent ends of said segments to hold the segments from springing away from the cutter-head, as set forth.

26. A cutter-head constructed with a body, and cutter-segments united thereto, said segments locked together at their adjacent edges, and said head formed with a flange projecting over and about the adjacent ends of said segments, as set forth.

27. A cutter-head formed with a body and with cutter-segments united thereto, said segments provided with teeth having their cutting edge of oval form, and said body formed with a flange projecting over and about the adjacent ends of the segments, for the purpose set forth.

In testimony whereof I sign this specification in the presence of two witnesses.

SOLON G. HOWE.

Witnesses:
 N. S. WRIGHT,
 MARY HICKEY.